UNITED STATES PATENT OFFICE.

THOMAS A. EDISON, OF MENLO PARK, NEW JERSEY.

TELEPHONE-REPEATER.

SPECIFICATION forming part of Letters Patent No. 422,578, dated March 4, 1890.

Application filed December 15, 1884. Serial No. 150,345. (No model.)

*To all whom it may concern:*

Be it known that I, THOMAS A. EDISON, of Menlo Park, in the county of Middlesex and State of New Jersey, have invented a new and useful Improvement in Telephone-Repeaters, (Case No. 637,) of which the following is a specification.

The object I have in view is to provide simple and efficient means whereby electric telephone undulations may be relayed from either of two line-circuits to the other without the use of switches for changing the line and local circuits in the relay apparatus, and with the result of clear and loud articulation of the receivers of the connected lines.

In carrying out my invention I employ for the repeater two receiving and two transmitting telephones, the receivers being arranged to operate the transmitters and being themselves worked by telephone undulations upon the two lines. Each transmitter is located in circuit with a battery and the primary of an induction-coil, the secondary of each coil being in one of the lines. I do not make a direct mechanical connection between each receiver and its accompanying transmitter, but provide each instrument with a diaphragm, the two diaphragms being separated a short distance by a body of confined air. This construction possesses numerous advantages over one wherein the receiver and transmitter of each pair have a common diaphragm.

I use for the repeater my electro-motograph telephone-receivers, the chalk cylinders being kept constantly in rotation by any suitable motor—such as an electric, spring, or weight motor—or by connections with a line shafting. The electro-motograph telephone-receivers are especially well adapted for this purpose by reason of their high resistance and consequent sensitiveness. The lines running to the repeater do not pass directly through the chalk receivers; but such receivers are operated by induction from the line-currents. To accomplish this, two induction-coils are employed, each having three circuits—a primary, a secondary, and a tertiary. Each line passes through the secondary of one induction-coil to ground. The tertiary of each induction-coil extends to the chalk receiver, which operates the transmitter located with a battery in the induction primary of the other line.

The construction of my transmitters is a peculiar one, the diaphragm of each instrument carrying a solid carbon electrode, which makes contact with a loose unconfined body of divided carbon. The body of divided carbon is held by a vessel, which is in whole or in part of conducting material to permit of making electrical connection therewith. The solid carbon electrode is preferably cone-shaped where it enters and bears upon the loose body of divided carbon.

The construction and operation of the parts will be better understood by reference to the accompanying drawings, in which—

Figure 1 is a view, principally in diagram, of the repeater; and Fig. 2, a separate view, on a larger scale, of the transmitter-electrodes.

A $a$ are two telephone-lines, which at the repeater pass through the secondary circuits of induction-coils B $b$ to earth E. The tertiary circuits of B and $b$ include the rollers and springs of chalk receiving telephones C $c$.

The telephone-transmitters D $d$, coupled with receivers C $c$, are, with suitable batteries $e$, located in the primaries of the induction-coils, D being in primary of $b$ and $d$ in primary of B. Each pair of telephone-instruments, of which the repeater has two, is composed of a receiver and transmitter. They have separate diaphragms $f$ $g$, which are placed close together, being separated by a closed air-chamber $h$. The transmitters have preferably for electrodes each a solid carbon button $i$, made with a conical head and a loose unconfined body of divided carbon $k$, held in a suitable vessel $l$. This vessel is wholly or partly of conducting material to make connection with the body of divided carbon.

The telephone-repeater in its general features, independent of the character and construction of the receivers and transmitters, is an effective instrument, being reciprocal in its action, and permitting a conversation to be carried on between instruments in connection with the two lines the same as if located upon the same line. The articulation is made better and the efficiency of the instrument largely increased by operating the receivers of the repeater through the medium of induc-

UNITED STATES PATENT OFFICE.

THOMAS A. EDISON, OF MENLO PARK, NEW JERSEY.

TELEPHONE-REPEATER.

SPECIFICATION forming part of Letters Patent No. 422,578, dated March 4, 1890.

Application filed December 15, 1884. Serial No. 150,345. (No model.)

*To all whom it may concern:*

Be it known that I, THOMAS A. EDISON, of Menlo Park, in the county of Middlesex and State of New Jersey, have invented a new and useful Improvement in Telephone-Repeaters, (Case No. 637,) of which the following is a specification.

The object I have in view is to provide simple and efficient means whereby electric telephone undulations may be relayed from either of two line-circuits to the other without the use of switches for changing the line and local circuits in the relay apparatus, and with the result of clear and loud articulation of the receivers of the connected lines.

In carrying out my invention I employ for the repeater two receiving and two transmitting telephones, the receivers being arranged to operate the transmitters and being themselves worked by telephone undulations upon the two lines. Each transmitter is located in circuit with a battery and the primary of an induction-coil, the secondary of each coil being in one of the lines. I do not make a direct mechanical connection between each receiver and its accompanying transmitter, but provide each instrument with a diaphragm, the two diaphragms being separated a short distance by a body of confined air. This construction possesses numerous advantages over one wherein the receiver and transmitter of each pair have a common diaphragm.

I use for the repeater my electro-motograph telephone-receivers, the chalk cylinders being kept constantly in rotation by any suitable motor—such as an electric, spring, or weight motor—or by connections with a line shafting. The electro-motograph telephone-receivers are especially well adapted for this purpose by reason of their high resistance and consequent sensitiveness. The lines running to the repeater do not pass directly through the chalk receivers; but such receivers are operated by induction from the line-currents. To accomplish this, two induction-coils are employed, each having three circuits—a primary, a secondary, and a tertiary. Each line passes through the secondary of one induction-coil to ground. The tertiary of each induction-coil extends to the chalk receiver, which operates the transmitter located with a battery in the induction primary of the other line.

The construction of my transmitters is a peculiar one, the diaphragm of each instrument carrying a solid carbon electrode, which makes contact with a loose unconfined body of divided carbon. The body of divided carbon is held by a vessel, which is in whole or in part of conducting material to permit of making electrical connection therewith. The solid carbon electrode is preferably cone-shaped where it enters and bears upon the loose body of divided carbon.

The construction and operation of the parts will be better understood by reference to the accompanying drawings, in which—

Figure 1 is a view, principally in diagram, of the repeater; and Fig. 2, a separate view, on a larger scale, of the transmitter-electrodes.

A $a$ are two telephone-lines, which at the repeater pass through the secondary circuits of induction-coils B $b$ to earth E. The tertiary circuits of B and $b$ include the rollers and springs of chalk receiving telephones C $c$.

The telephone-transmitters D $d$, coupled with receivers C $c$, are, with suitable batteries $e$, located in the primaries of the induction-coils, D being in primary of $b$ and $d$ in primary of B. Each pair of telephone-instruments, of which the repeater has two, is composed of a receiver and transmitter. They have separate diaphragms $f$ $g$, which are placed close together, being separated by a closed air-chamber $h$. The transmitters have preferably for electrodes each a solid carbon button $i$, made with a conical head and a loose unconfined body of divided carbon $k$, held in a suitable vessel $l$. This vessel is wholly or partly of conducting material to make connection with the body of divided carbon.

The telephone-repeater in its general features, independent of the character and construction of the receivers and transmitters, is an effective instrument, being reciprocal in its action, and permitting a conversation to be carried on between instruments in connection with the two lines the same as if located upon the same line. The articulation is made better and the efficiency of the instrument largely increased by operating the receivers of the repeater through the medium of induction-coils, instead of directly by the line-currents and by the use of the electro-motograph receivers.

With regard to the more special features, the manner of coupling mechanically the receivers and transmitters and the peculiar construction of the transmitter-electrodes make the repeater a better operating instrument.

What I claim is—

1. In a reciprocal telephone-repeater, the combination, with two telephone-lines, of two telephone receiving-instruments connected inductively, one with each of said lines, and two telephone transmitting-instruments operated by such receivers, and also connected inductively, one with each of said lines, substantially as set forth.

2. In a reciprocal telephone-repeater, the combination, with two telephone-lines grounded at the repeater, of two induction-coils having each three circuits, (a primary, a secondary, and a tertiary,) and two pairs of telephone receivers and transmitters, the lines and the telephone receivers and transmitters being connected with the three circuits of such induction-coils, and being arranged for operation substantially as set forth.

3. In a reciprocal telephone-repeater, the combination, with two telephone-lines, of two high-resistance telephone receiving-instruments connected inductively, one with each of said lines, and two telephone transmitting-instruments operated by such high-resistance receivers, and also connected inductively, one with each of said lines, substantially as set forth.

This specification signed and witnessed this 9th day of December, 1884.

THOMAS A. EDISON.

Witnesses:
WM. H. MEADOWCROFT,
THOS. G. GREENE, Jr.